(12) United States Patent
Kegasawa et al.

(10) Patent No.: US 6,461,138 B2
(45) Date of Patent: Oct. 8, 2002

(54) DEVICE FOR FORMING MULTILAYER SHEETS AND EXTRUSION DIE THEREFOR

(75) Inventors: Tadahiro Kegasawa; Kazuo Ozaki; Shotaro Ogawa; Ryuichi Katsumoto, all of Shizuoka; Hideaki Usui, Kanagawa, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/767,725

(22) Filed: Jan. 24, 2001

(65) Prior Publication Data

US 2001/0005517 A1 Jun. 28, 2001

Related U.S. Application Data (62) Division of application No. 09/137,833, filed on Aug. 21, 1998, now Pat. No. 6,203,742.

(30) Foreign Application Priority Data

Aug. 22, 1997 (JP) .............................. 9-226208

(51) Int. Cl.[7] .................. B29C 47/06; B29C 47/14
(52) U.S. Cl. ............... 425/133.5; 425/190; 425/192 R; 425/462
(58) Field of Search ............... 425/133.5, 382.4, 425/462, 465, 190, 192 R (56) References Cited

U.S. PATENT DOCUMENTS

| | | | |
|---|---|---|---|
| 4,533,308 A | 8/1985 | Cloeren | 425/131.1 |
| 4,592,885 A | 6/1986 | Ichino et al. | 264/171 |
| 4,600,550 A | 7/1986 | Cloren | 264/171 |
| 4,695,236 A | 9/1987 | Predohl et al. | 425/131.1 |
| 4,789,513 A | 12/1988 | Cloeren | 264/171 |
| 5,045,264 A | 9/1991 | Kirksey | 264/171 |
| 5,147,195 A | 9/1992 | Cloeren | 425/133.5 |
| 5,211,898 A | 5/1993 | Shinmoto | 264/171 |
| 5,814,258 A | 9/1998 | Ogawa et al. | 264/173.12 |
| 6,203,742 B1 * | 3/2001 | Kegasawa et al. | 264/173.16 |

FOREIGN PATENT DOCUMENTS

| | | |
|---|---|---|
| DE | 41 40 146 | 6/1992 |
| EP | 0 781 641 | 7/1997 |
| JP | 52-60853 | 5/1977 |
| JP | 54-107664 | 7/1979 |
| JP | 56 136328 | 10/1981 |
| JP | 60-37781 | 8/1985 |
| JP | 62-149411 | 7/1987 |
| JP | 62-43846 | 9/1987 |
| JP | 7-15321 | 3/1995 |

* cited by examiner

Primary Examiner—Jan H. Silbaugh
Assistant Examiner—Joseph Leyson
(74) Attorney, Agent, or Firm—Sughrue Mion, PLLC (57) ABSTRACT

Broad parts are formed on at least one passage including a passage for forming the thinnest layer among passages for respective resin layers of a multilayer sheet at an upstream side of a confluence. In the broad parts, clearances become larger to both ends of the passage along the width thereof.

3 Claims, 6 Drawing Sheets

ENLARGED VIEW OF PART A

DEVICE FOR FORMING MULTILAYER SHEETS AND EXTRUSION DIE THEREFOR

This is a divisional of application Ser. No. 09/137,833 filed on Aug. 21, 1998, which issued as U.S. Pat. No. 6,203,742 B1, the disclosure of which is incorporated herein by reference.

BACKGROUND OF THE INVENTION

1. Field of the Invention

The present invention relates generally to an apparatus for forming multilayer sheets, and more particularly to an apparatus having an extrusion die for forming multilayer sheets for photographic printing paper supports, wherein each thickness of the individual layers composing the multilayer sheet is formed to be uniform in a widthwise direction.

2. Description of Related Art

A coextrusion apparatus is usually used for forming multilayer sheets or films for photographic printing paper supports. A feed block die cannot make each of resin layers composing a multilayer sheet have uniform thickness widthwise, in particular if there are great differences in viscosity, temperature and flow rate between melted resins, which form the resin layers. Even if a multi-manifold die, which forms relatively small unevenness of thickness of each layer, is used, it is difficult to obtain multilayer sheets with an extremely small unevenness of thickness of each layer that is desired for the multilayer sheets for the photographic printing paper supports.

To solve these problems, several techniques have been suggested for adjusting the thickness of each layer by means of a multi-manifold die. For example, Japanese Utility Model Provisional Publication No. 54-107664 discloses a multi-manifold die that adjusts they clearances in the entire passages extending from manifolds to a confluence, where the melted resins join one another through the respective passages, with use of a choke bar mechanism. Japanese Patent Provisional Publication No. 52-60853 discloses a method for manufacturing a coextrusion film. According to this method, at least one choke bar facing the confluence adjusts a confluent angle formed by the passages of the melted resins at the confluence. Japanese Utility Model Provisional Publication No. 7-15321 discloses a multilayer sheet forming apparatus providing a passage sectional area adjusting means, which forms a thin plate and pushes and pulls the thin plate along the thickness of the thin plate at the non-passage side of the thin plate, at a part in at least one of plural passages from the manifolds to the confluence. According to Japanese Patent Publication No. 60-37781, manifolds are straight, and there is provided a passage that becomes wider from the center of the die towards both ends thereof, and a slot that becomes narrower from the center of the die towards both ends thereof.

The-above-mentioned techniques, however, have a problem in that it is extremely difficult to eliminate the unevenness of thickness of each of resin layers composing the multilayer sheet along the width thereof or to obtain the multilayer sheet that has a small unevenness of thickness of each layer.

In particular, the above-mentioned arts are disadvantageous to form the multilayer sheets for the photographic printing paper supports, wherein there are great differences in viscosity, temperature and flow rate between the melted resins, which form the resin layers, and it is required that the unevenness of thickness of each layer along the width thereof is ±1 µm or less.

SUMMARY OF THE INVENTION

The present invention has been developed under the above-described circumstances, and has as its object the provision of a method for forming a multilayer sheet and an extrusion apparatus therefor that is able to form a multilayer sheet composed of resin layers on the condition that melted resins forming the layers are greatly different from one another in viscosity, temperature and flow rate, and unevenness of thickness of each layer along the width thereof is required to be extremely small.

To achieve the above-mentioned object, the present invention is directed to a method for forming a multilayer sheet by means of a multilayer sheet forming apparatus in which a plurality of melted resins join at a confluence through respective passages, the melted resins are piled in layers at the confluence, and the melted resins are extruded through a slot to form the multilayer sheet, broad parts being formed on upstream side of the confluence of at least one passage including a passage for forming the thinnest layer among the passages, the broad parts having clearances which become larger toward both ends of the passage along the width thereof.

Furthermore, to achieve the above-mentioned object, the present invention is directed to a multilayer sheet forming apparatus which forms a multilayer sheet by extruding melted resins from a slot, wherein: the melted resins are supplied to a plurality of manifolds, the supplied resins are extended at the manifolds along widths of passages connecting the manifolds to a confluence, the extended resins are piled in layers at the confluence, and the piled resins are extruded from the slot; a pair of broad parts are formed on at least one of the passages at an upstream side of the confluence, the at least one of the passages including the passage for forming the thinnest layer among the layers, the pair of broad parts having clearances that become larger from broadening start points to both ends of the at least one of the passages along the width thereof; a relation between a total width (W) of the pair of broad parts and a width (L) of the at least one of the passages is $W \geq 0.1 L$; and a relation between a clearance (de) of the broad part at the end of the at least one of the passages and a clearance (dc) at the broadening start point is $2.0 \geq de/dc > 1.0$.

According to the present invention, the broad parts are formed on at least one passage including the passage for forming the thinnest layer among the passages for respective resin layers of the multilayer sheet at the upstream side of the confluence. In the broad parts, the clearance becomes larger toward both ends of the passage along the width thereof. Consequently, the thickness of the resin layers including the thinnest layer is uniform along the width thereof.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
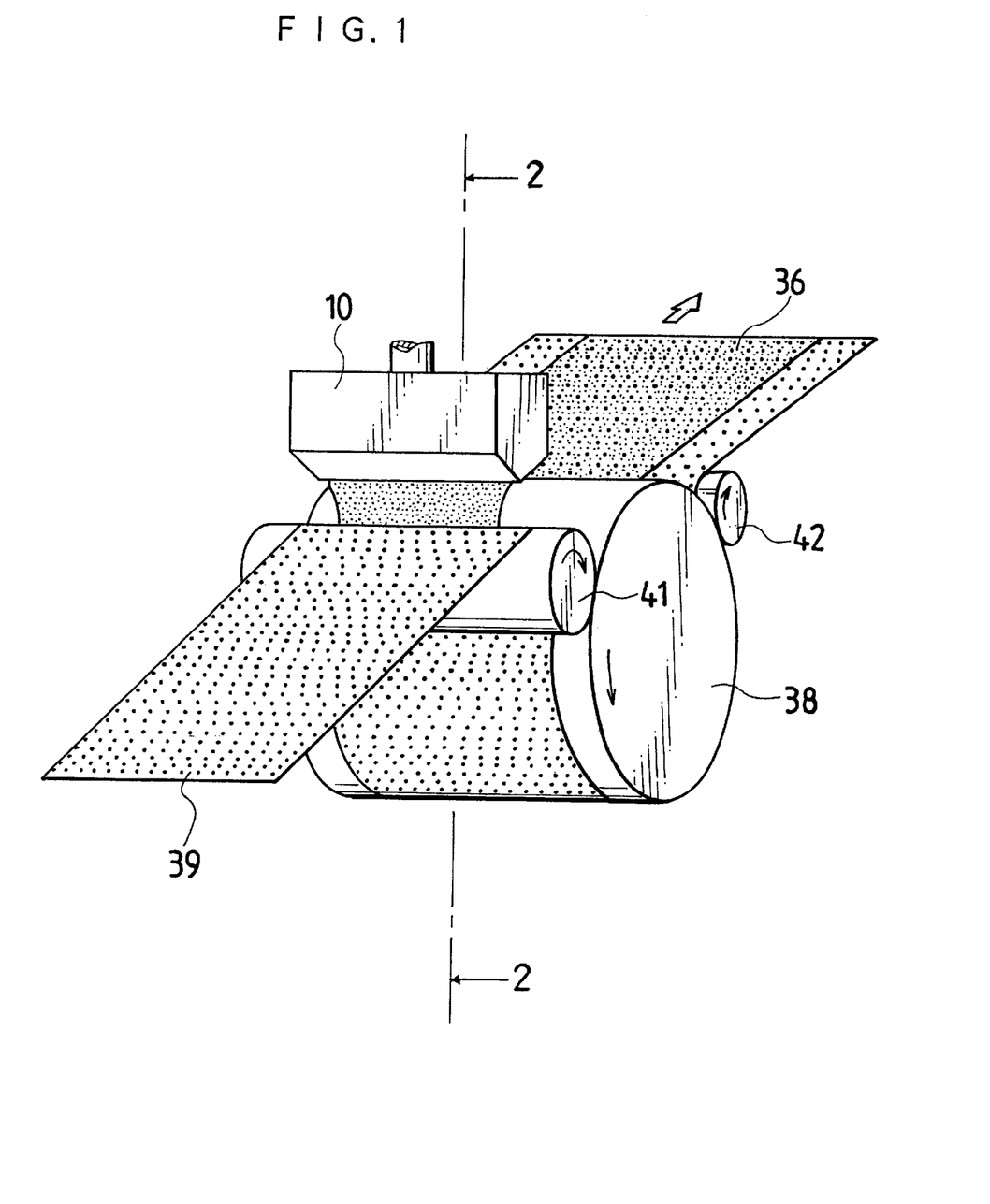
FIG. 1 is a view illustrating the appearance of a multilayer coextrusion apparatus according to the present invention.
Figure 2:
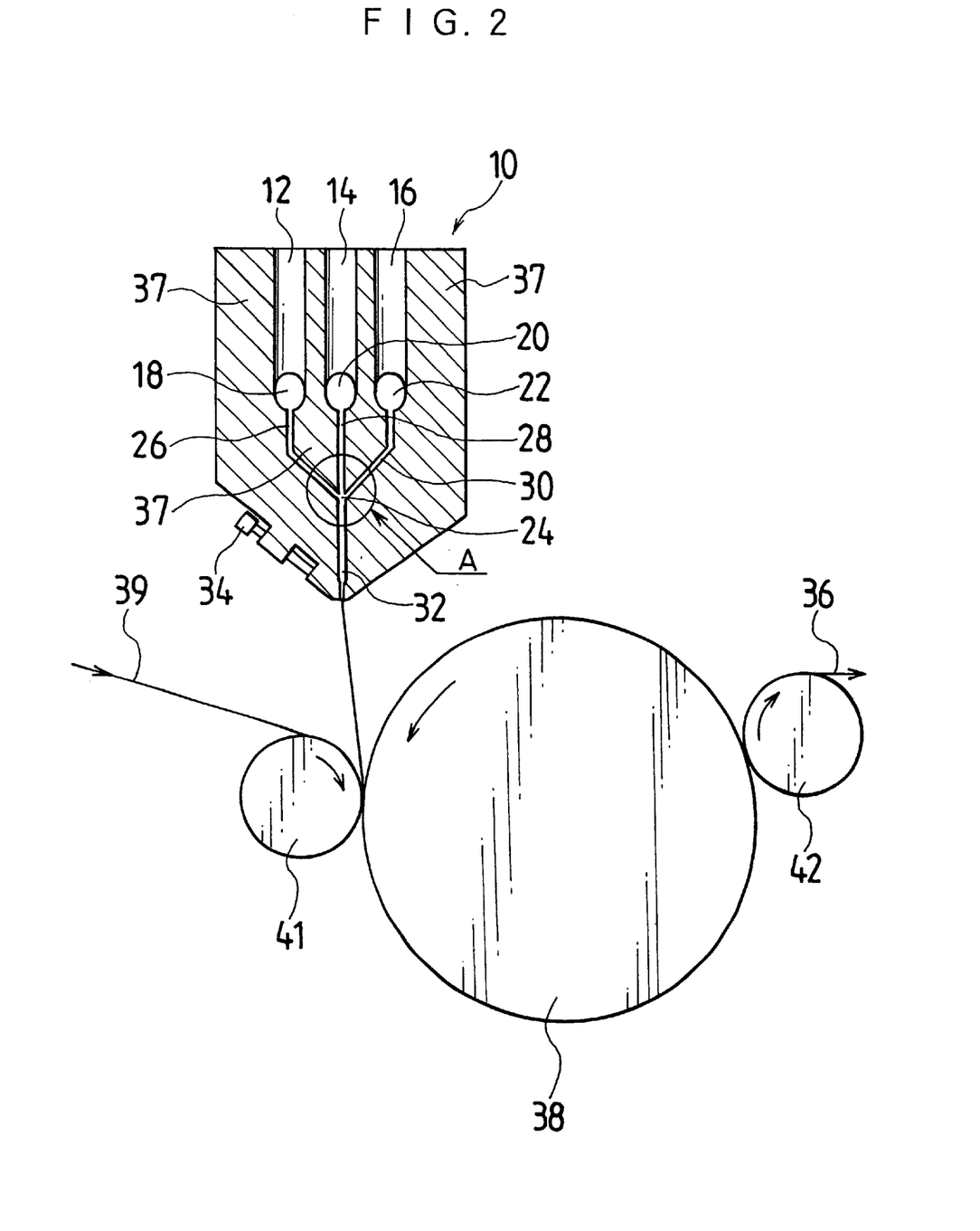
FIG. 2 is a sectional view taken along line 2—2 of FIG. 1.

FIG. 1 shows the appearance of a coextrusion apparatus including a multilayer sheet or film forming die 10 according to the present invention. FIG. 2 is a sectional view taken along a line 2—2 of FIG. 1.

As shown in FIGS. 1 and 2, the extrusion die 10 comprises manifolds 18, 20 & 22 to which respective melted resins are supplied through supply passages 12, 14 & 16 from screw extruders (not shown), a confluence 24 where the melted resins are piled in layers, passages 26, 28 & 30 that connect the manifolds 18, 20 & 22 to the confluence 24, a slot 32 through which the multiple layers of resins are extruded from the confluence 24 to the outside, and a regulation bolt 34 that regulates a clearance of the slot 32. A plurality of die blocks 37 are combined to construct the manifolds 18, 20 & 22, the passages 26, 28 & 30, and the slot 32 in the extrusion die 10.

When the coextrusion apparatus forms a multilayer sheet 36 for a photographic printing paper support, the melted resins, which are different in viscosity, are supplied to the manifolds 18, 20 & 22, and they are extended along the width of the passages 26, 28 & 30 at the manifolds 18, 20 & 22 so as to form sheet or film-like streams. Then, the melted resins join at the confluence 24 through the passages 26, 28 & 30. The melted resins are piled in layers at the confluence 24, and they are extruded from the slot 32 onto a printing paper substrate 39, which moves on a cooling roller 38. The substrate 39 is covered with the extruded resin layers between the cooling roller 38 and a nip roller 41, and becomes the multilayer sheet 36 for the photographic printing paper base. The multilayer sheet 36 separates from the cooling roller 38 via a release roller 42.

Figure 3:
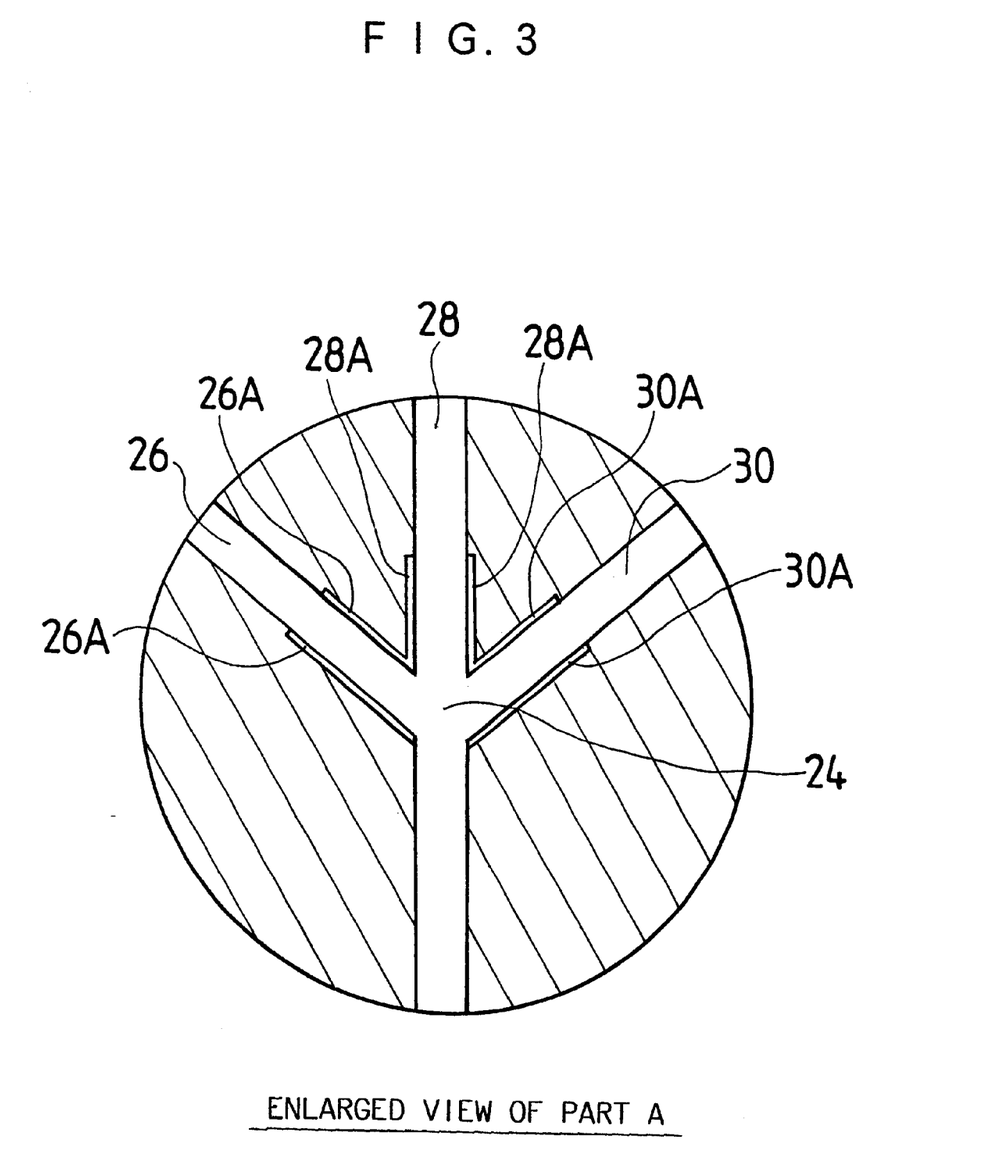
FIG. 3 is an enlarged view of a part A in FIG. 2.

As shown in FIG. 3, broad parts 26A, 28A & 30A are formed on a upstream side of the confluence 24 of at least one passage including the passage that forms the thinnest layer among the passages 26, 28 & 30 for the respective layers of the multilayer sheet 36.

Figure 4:
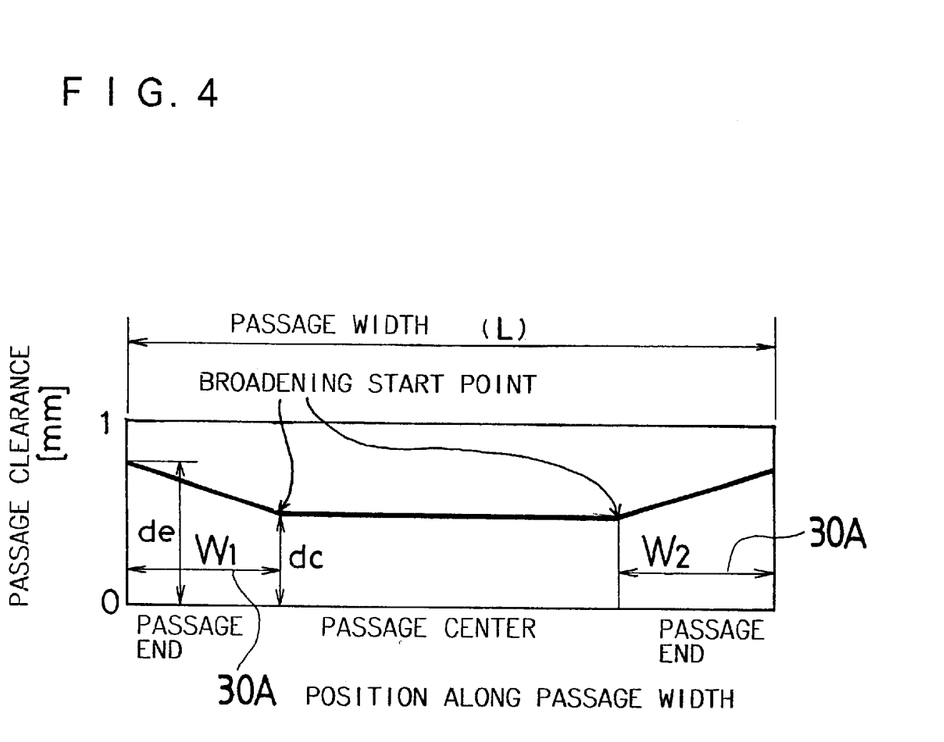
FIG. 4 is a view of assistance in explaining the widths of broad parts and clearances at the broad parts in a passage of the extrusion die according to the present invention.

FIG. 4 shows positions and clearances of the broad parts 30A formed in the passage 30, for example. As shown in FIG. 4, the broad parts 30A are formed at both ends of the passage 30. The clearances are larger at the broad parts than at the central part of the passage. The clearances become larger from broadening start points toward the ends of the passage 30 or the ends of the broad part 30A. The broad parts 30A from the broadening start points to the ends of the passage 30 may be straight as shown in FIG. 4 or may be curved inward or outward. Whether the broad parts are straight or curved depends on rheological characteristics, temperature, flow rate, etc. of the melted resins.

The width of the broad parts 30A formed at both ends of the passage 30 and the amount of clearances at the broad parts 30A satisfy conditions stated below.

The total width W of the broad parts 30A formed at both ends of the passage 30 must satisfy the following inequality (1):

$$W \geq 0.1\ L\ (W:W_1+W_2) \tag{1}$$

where $W_1$ is the width of the broad part of one side, $W_2$ is the width of the broad part of the other side; and L is the width of the passage 30. The total width W is preferably equal to or larger than 0.12 L, and more suitably equal to or larger than 0.15 L.

The clearance of the passage at the broad parts 30A must satisfy the following inequality (2):

$$2.0 \geq de/dc > 1.0 \tag{2}$$

where dc is the clearance at the broadening start point, and de is the clearance at the end of the passage de/dc is preferably between 1.0 and 1.8, more suitably between 1.2 and 1.6.

Figure 5:
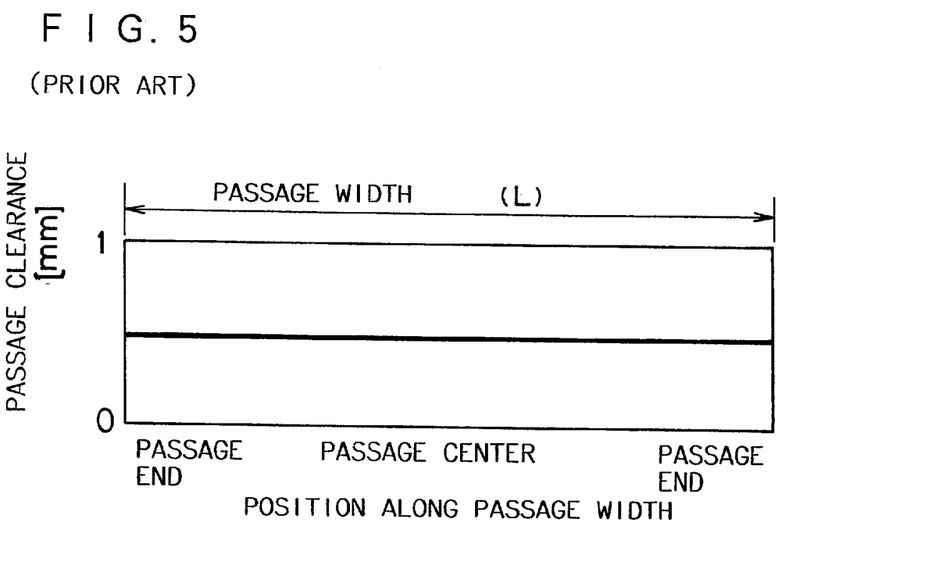
FIG. 5 is a view of assistance in explaining a clearance in a passage of a conventional extrusion die.

FIG. 5 shows a passage in a conventional extrusion die, and the clearance is uniform at both ends and central part of the passage.

Figure 6:
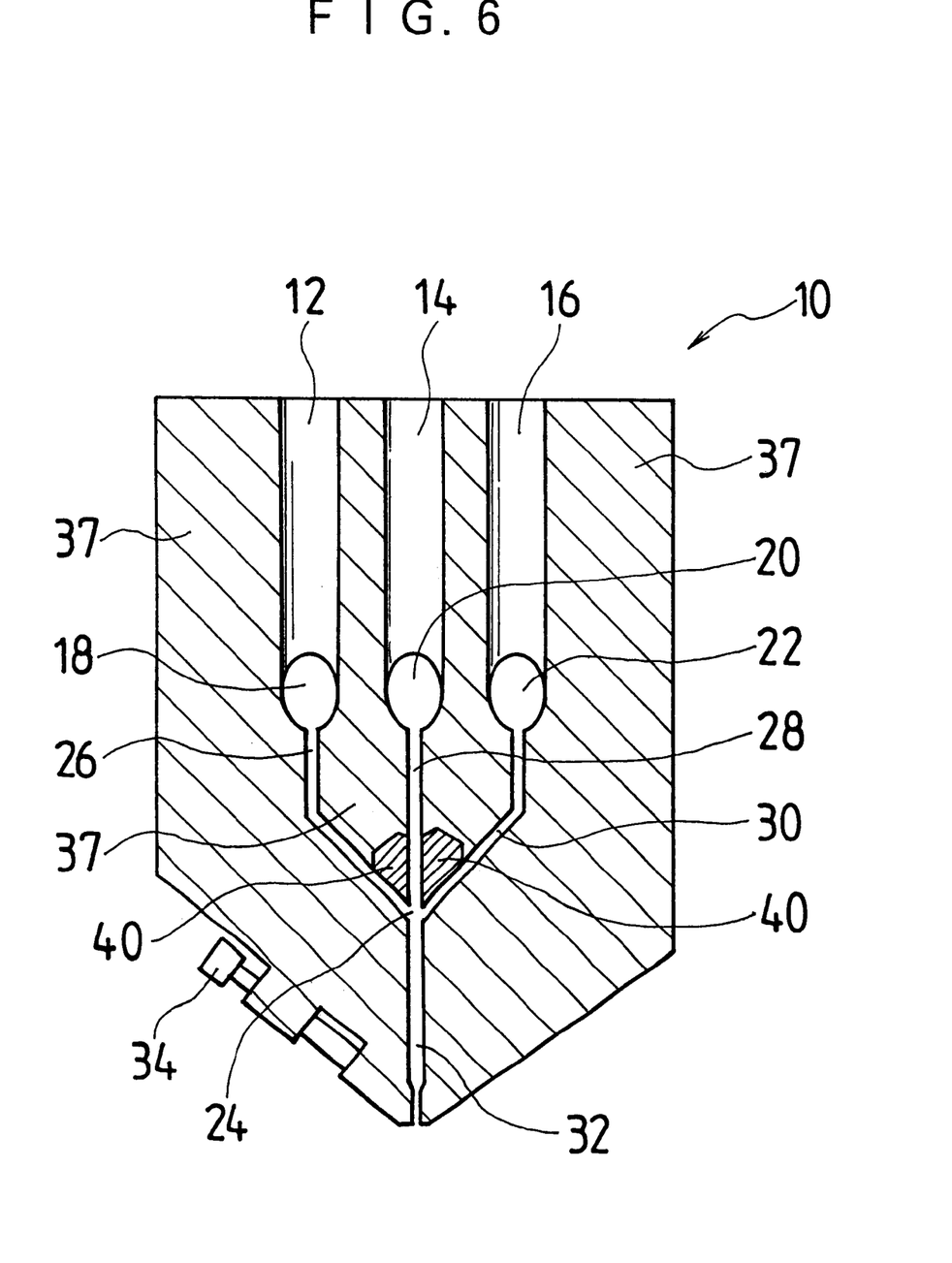
FIG. 6 is a sectional view of assistance in explaining a restriction bar that forms the broad parts.

To form the broad parts 30A of the passage 30, the die blocks 37 of the extrusion die 10 are machined in such a way as to satisfy the above-mentioned conditions (1) and (2), or a restriction bar 40 that forms desired broad parts may be fixed in a hole (not shown) in the die blocks 37 to form the passage 30 with the broad parts 30A as shown in FIG. 6. It is convenient to use the restriction bar 40 since a plurality of restriction bars 40, which are different in width and clearance of the broad parts 30A, can be exchanged in accordance with the Theological characteristics, temperature, flow rate, etc. of the melted resin.

A description will be given of the operation of the above-described extrusion die for the multilayer sheet by way of an example in which the broad parts 26A, 28A & 30A are formed at the passages 26, 28 & 30, respectively, by means of the restriction bars 40. In this example, the multilayer sheet 36 is composed of three layers: a bottom layer 36A, an middle layer 36B, and a top layer 36C. The thinnest layer of these three layers is the top layer 36C (see FIGS. 7–9).

The restriction bars 40, which are provided at the passages 26, 28 & 30, form the broad parts 26A, 28A & 30A suitable for the viscosity, temperature and flow rate of melted resins flowing through the passages 26, 28 & 30. It is necessary to know a relationship between the conditions such as the viscosity, temperature and flow rate of the flowing resins and the various restriction bars 40 in advance by test runs.

The melted resins supplied to the manifolds 18, 20 & 22 join at the confluence 24 through the passages 26, 28 & 30, respectively. The melted resins are piled in layers at the confluence 24, and they are extruded onto the printing paper substrate 39 through the slot 32. In the conventional apparatus, when the multilayer melted resins are extruded, the balance of extrusion pressure along the width of the passages 26, 28 & 30, which form the layers 36A, 36B & 36C, can be lost due to the differences in viscosity, temperature and flow rate between the melted resins, which become the layers 36A, 36B & 36C of the multilayer sheet 36. In particular, when the viscosity and flow rate of the thinnest layer 36C are smaller than those of the other layers 36A, 36B, the pressure for extruding the melted resin flowing through the passage 30 for example is smaller at the ends of the passage than at the central part. Accordingly, the melted resin tends to flow intensively at the central part of the passage 30 for the thinnest layer 36A, and thus, the multilayer sheet 36 has the thinnest layer 36C with the thick central part and thin both ends (see FIG. 8). To eliminate this disadvantage, the extrusion die 10 according to the present invention is provided with broad parts at both ends of the passage in areas where the extrusion pressure is small. The broad parts are formed in such a way as to satisfy the inequality (1).

There is a difference in pressure at both ends of the passage, where the extrusion pressure is small. As the position is near the end of the passage, the extrusion pressure downs. For this reason, it is necessary to satisfy the inequality (2) in order to adjust the clearance at the broad part in accordance with the difference in extrusion pressure.

As stated above, according to the present invention, at least one of the broad parts 26A, 28A & 30A are formed on the upstream side of the confluence 24 for at least one passage including the passage that forms the thinnest layer 36C among the passages 26, 28 & 30 for the layers 36A, 36B & 36C, respectively. This makes the layers 36A, 36B & 36C of the multilayer sheet 36, particularly the thinnest layer 36C a uniform thickness along the width of the multilayer sheet 36.

EXAMPLE

A description will now be given of an example wherein the above-described coextrusion apparatus forms the multilayer sheet 36 composed of the top layer 36C, the middle layer 36B and the bottom layer 36A.

TABLE 1 shows the conditions of the formation of the multilayer sheet 36.

TABLE 1

| Extrusion temperature [° C.] | | 300 (all the layers) |
|---|---|---|
| Width of passage [mm] | | 1000 |
| Line speed (speed of substrate) [m/min] | | 150 |
| Substrate material | | Paper of 180 g/m² |
| Resin | Top layer | Low density polyethylene (MI = 10) |
| | Middle layer | Low density polyethylene (MI = 3) (added with pigment) |
| | Bottom layer | Low density polyethylene (MI = 5) |
| Flow rate [kg/hr] | Top layer | 15 |
| | Middle layer | 185 |
| | Bottom layer | 100 |
| Extruder | Top layer | φ2.5 inch single spindle extruder |
| | Middle layer | φ3.5 inch single spindle extruder |
| | Bottom layer | φ3.5 inch single spindle extruder |

TABLE 2 shows the clearances of the passages 26, 28 & 30 on the upstream sides of the confluence 24.

TABLE 2

| Clearance of bottom layer passage | 1.5 mm flat (no broad part) |
|---|---|
| Clearance of middle layer passage | 2.5 mm flat (no broad part) |
| Clearance of top layer passage Embodiment 1 | Clearance at central part: 0.5 mm Width of broad part: 360 mm ($W_1 = W_2 = 180$ mm) Clearance at broad part: passage end 0.75 mm, Broadening start point 0.5 mm |
| Clearance of top layer passage Comparative example 1 | 0.5 mm flat (no broad part) |
| Clearance of top layer passage | Clearance at central part: 0.5 mm |

TABLE 2-continued

| Comparative example 2 | Width of broad part: 360 mm ($W_1 = W_2 = 180$ mm) Clearance at broad part: passage end 1.25 mm, Broadening start point 0.5 mm |
|---|---|

In the embodiment 1 according to the present invention, broad parts are formed at both ends of the top layer passage. The total width of the broad parts is 360 mm (180 mm+180 mm) so that the ratio of the broad part width (W) to the passage width (L) can be 0.36 to satisfy the condition $W \geq 0.1 L$ (the inequality 1). The clearance at the ends of the passage is 0.75 mm, and the clearance at the broadening start points is 0.5 mm. Consequently, de/dc is 1.5, which satisfies the condition $2.0 \geq de/dc > 1.0$ (the inequality 2). The clearance at the center of the passage is 0.5 mm.

In the comparative example 1, the clearance of the passage is constant at 0.5 mm, which is the same as the clearance at the center of the passage in the embodiment 1.

In the comparative example 2, broad parts are formed at both ends of the top layer passage as is the case with the embodiment 1. The clearance at the passage ends is 1.25 mm, and the clearance at the broadening start points is 0.5 mm. Consequently, de/dc is 2.5, which exceeds the range $2.0 \geq de/dc > 1.0$ (the inequality 2).

In the embodiment 1 and the comparative examples 1 and 2, no broad part is formed in the passages 26 & 28 for the bottom layer 36A and the middle layer 36B, so that the clearances are constant.

Figure 7:
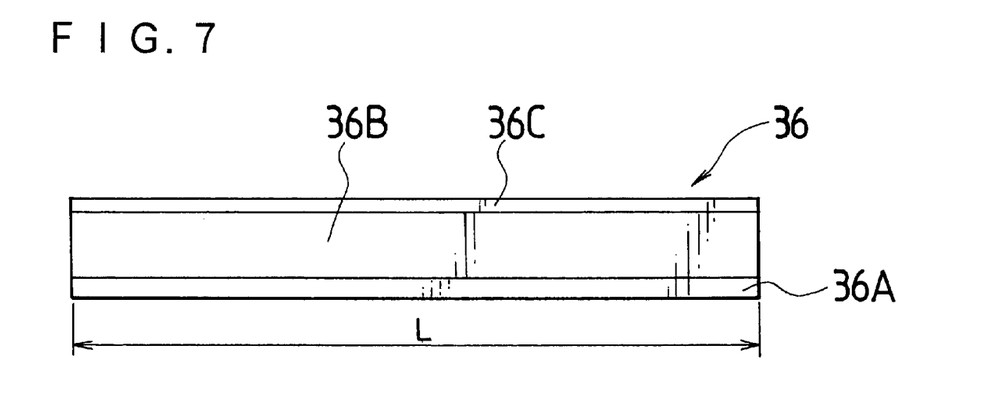
FIG. 7 is a conceptional section view taken along the width of the multilayer sheet formed in an embodiment 1.
Figure 8:
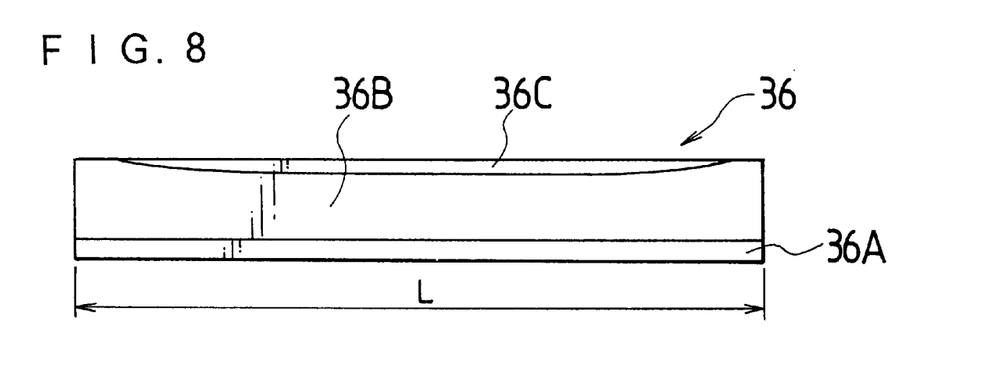
FIG. 8 is a conceptional section view taken along the width of the multilayer sheet formed in a comparative example 1.
Figure 9:
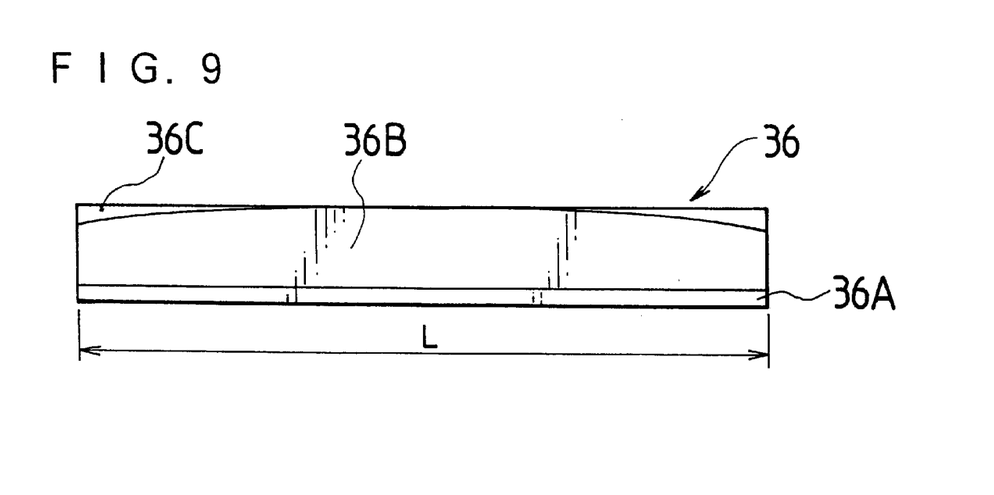
FIG. 9 is a conceptional section view taken along the width of the multilayer sheet formed in a comparative example 2.

TABLE 3 shows the evaluation results obtained by measuring the unevenness in thickness of the layers 36A, 36B & 36C along the width thereof. FIG. 7 is a conceptional section view obtained by observing the section of the multilayer sheet in the embodiment 1 through a microscope. Likewise, FIG. 8 is a conceptional section view of the multilayer sheet in the comparative example 1, and FIG. 9 is a conceptional section view of the multilayer sheet in the comparative example 2.

TABLE 3

| | Embodiment 1 | Comparative example 1 | Comparative example 2 |
|---|---|---|---|
| Thickness of top layer [μm] | 1.5 ± 0.3 | 1.5 ± 2.0 | 1.5 ± 1.5 |
| Thickness of middle layer [μm] | 18.5 ± 0.8 | 18.5 ± 2.5 | 18.5 ± 2.0 |
| Thickness of bottom layer [μm] | 10.0 ± 0.5 | 10.0 ± 0.5 | 10.0 ± 0.5 |

As is clear from TABLE 3, the unevenness of the thickness of the top layer 36C (the thinnest layer) in the embodiment 1, in which the broad parts are formed so as to satisfy the above-mentioned conditions (1) and (2), is ±0.3 μm, which is much smaller than ±1 μm that is the maximum permissible unevenness of thickness of the layer of the multilayer sheet for the photographic printing paper base whose unevenness is required to be extremely small. As shown in FIG. 7, the top, middle and bottom layers of the obtained multilayer sheet are uniform in thickness widthwise.

To the contrary, the unevenness of the top layer in the comparative example 1, where the broad parts are not formed, is ±2.0 μm, which is much larger than that of the embodiment 1. As shown in FIG. 8, if the broad parts are not provided in the passage forming the top layer 36C, the top layer 36C is formed only at the central part of the passage, not at both ends of the passage. If the broad parts are not provided in the passage forming the thinnest layer as mentioned above, the extrusion pressure is smaller at the ends of the passage than at the central part thereof, and the melted resin flows intensively to the central part of the passage.

In the comparative example 2 in which the clearances at the broad parts exceed the range of the above inequality (2), the unevenness of the top layer 36C is ±1.5 μm, which is smaller than the unevenness in the comparative example 1 but is larger than the unevenness in the embodiment 1. As shown in FIG. 9, in the comparative example 2, the top layer 36C is thinner at the central part than at both ends. In other words, even if the broad parts are provided in the passage, the resin layer cannot be uniform in thickness along the width thereof if de/dc exceeds 2.0.

When de/dc is less than 1.0, the formed top layer is not uniform in thickness along the width thereof.

As set forth hereinabove, according to the method for forming the multilayer sheet and the coextrusion apparatus therefor of the present invention, the simple structure in which the broad parts are provided makes the thickness of each layer of the multilayer sheet uniform along the width thereof, even if there are great differences in viscosity, temperature and flow rate between the resins forming the layers of the sheet. In particular, by providing the broad parts in the passage forming the thinnest resin layer, the unevenness of the thickness of each layer of the multilayer sheet for the photographic printing paper base can be extremely small. By providing the broad parts, the die does not become large in size.

Accordingly, the present invention makes it possible for the compact extrusion die to stably manufacture the multilayer sheet of which resin layers are uniform in thickness along the width thereof. Consequently, the use of the extrusion die according to the present invention makes it possible to manufacture the multilayer sheet for the photographic printing paper base, which is excellent in flatness with little distortion and unevenness.

Furthermore, since the extrusion die is compact, the air gap can be small during the extrusion to thereby reduce the neck-in of the extruded resin layer. It is therefore possible to reduce the waste selvages (both ends of the multilayer sheet).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A multilayer sheet forming apparatus which forms a multilayer sheet by extruding melted resins, comprising:

a plurality of manifolds supplied with melted resins;

a confluence located downstream from the plurality of manifolds;

passages connecting the manifolds to the confluence, wherein the supplied resins are extended at the manifolds along widths of the passages connecting the manifolds to a confluence, and wherein the extended resins are piled in layers at the confluence; and a slot located downstream from the confluence, the slot being adapted to extrude piled resins therefrom, wherein:

at least one of the passages further comprises a pair of broad parts formed therein, said at least one of the passages including the passage for forming the thinnest layer among the layers, wherein the pair of broad parts are adapted to include clearances that become larger from broadening start points to both ends of said at least one of the passages along the width thereof; and wherein:

a relation between a total width (W) of the pair of broad parts and a width (L) of said at least one of the passages is W≧0.1L; and a relation between a clearance (de) of the broad part at the end of said at least one of the passages and a clearance (dc) at the broadening start point is 2.0≧de/dc>1.0.

2. The multilayer sheet forming apparatus of claim 1, wherein the broad parts of said at least one of the passages are formed on die blocks that form the confluence, wherein the broad parts are formed by machining the die blocks.

3. The multilayer sheet forming apparatus of claim 1, wherein the broad parts of said at least one of the passages are formed by fitting a restriction bar into a hole formed in die blocks forming the confluence, wherein the restriction bar is used to form a desired broadening dimension.

* * * * *